(12) United States Patent
Mullet et al.

(10) Patent No.: US 8,968,900 B2
(45) Date of Patent: *Mar. 3, 2015

(54) FLEXIBLE SLEEVE BATTERY HOLDER APPARATUS AND METHOD

(75) Inventors: Willis Jay Mullet, Gulf Breeze, FL (US); Christopher Lee Wysoczynski, Gulf Breeze, FL (US); Harry Edward Asbury, Holt, FL (US)

(73) Assignee: QMotion Incorporated, Pensacola, FL (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/932,611

(22) Filed: Mar. 1, 2011

(65) Prior Publication Data

US 2012/0225340 A1 Sep. 6, 2012

(51) Int. Cl.
*H01M 2/10* (2006.01)
*H01M 2/20* (2006.01)

(52) U.S. Cl.
CPC .............. *H01M 2/105* (2013.01); *H01M 2/204* (2013.01)
USPC ................................ 429/99; 429/96; 429/100

(58) Field of Classification Search
USPC ........ 429/96, 99, 100; 160/168.1 P, 170, 310, 160/405
See application file for complete search history.

(56) References Cited

U.S. PATENT DOCUMENTS

| RE29,047 | E | 11/1976 | Brindley |
| 4,114,187 | A | 9/1978 | Uke |
| 4,171,845 | A * | 10/1979 | Hirsch .......................... 296/97.4 |
| 4,527,223 | A | 7/1985 | Maglica |
| 4,577,263 | A | 3/1986 | Maglica |
| 4,656,565 | A | 4/1987 | Maglica |
| 4,680,682 | A | 7/1987 | Parker |
| 5,486,432 | A | 1/1996 | Sharrah et al. |
| 6,057,658 | A | 5/2000 | Kovach et al. |
| 6,181,089 | B1 | 1/2001 | Kovach et al. |
| 6,238,818 | B1 * | 5/2001 | Dalton ............................. 429/96 |
| 6,259,218 | B1 | 7/2001 | Kovach et al. |
| 6,303,248 | B1 | 10/2001 | Peterson |
| 6,369,530 | B2 | 4/2002 | Kovach et al. |
| 6,680,594 | B2 | 1/2004 | Collett et al. |
| 7,375,494 | B2 | 5/2008 | Daniel et al. |
| 7,389,806 | B2 | 6/2008 | Kates |
| 2001/0050538 | A1 * | 12/2001 | Kovach et al. .................. 318/16 |
| 2010/0269988 | A1 * | 10/2010 | Mullet et al. .................. 160/310 |

* cited by examiner

*Primary Examiner* — Zachary Best
(74) *Attorney, Agent, or Firm* — Zarley Law Firm, P.L.C.

(57) ABSTRACT

A battery holder apparatus and method includes a sleeve with an inside surface and an outside surface where the sleeve is flexible. A battery receiving space is created within the sleeve where the battery receiving space expands and the sleeve flexes to accommodate a battery when inserted therein and the inside surface at least partially contacts the battery. And a connection device is provided on the outside surface of the sleeve.

17 Claims, 7 Drawing Sheets

FLEXIBLE SLEEVE BATTERY HOLDER APPARATUS AND METHOD

FIELD OF THE INVENTION

This invention relates to a battery holder apparatus and method. In particular, in accordance with one embodiment, the invention relates to a battery holder apparatus including a sleeve with an inside surface and an outside surface where the sleeve is flexible. A battery receiving space is created within the sleeve where the battery receiving space expands and the sleeve flexes to accommodate a battery when inserted therein and the inside surface at least partially contacts the battery. And a connection device is provided on the outside surface of the sleeve.

BACKGROUND OF THE INVENTION

There are several problems that arise with devices using batteries. In some devices, batteries move relative to the device and cause wear and tear on electrical connections and other elements of the device. Further, because battery sizes vary, some batteries that are otherwise satisfactory may not be used at all in some devices.

Batteries placed in a tube are common in flashlights, for example, and although there is movement of a flashlight during use the movement generally does not exceed the biasing tension of springs and clips normally designed into the battery holding area such that batteries in a flashlight do not move relative to the tube. In flashlights, battery manufacturers recommend certain amounts of spring tension to prevent damage to the batteries. Most damage is caused from contacts corroding and causing poor connection. This causes the light to fade or go out and a bump on the flashlight will bring it back. In shade systems, however, in which shades are connected to tube rolls operated by batteries, the motion of the tube roll causes the batteries to move relative to the tube roll. This causes wear and tear on the electrical connections. In the case of motorized shade systems, however, these voltage drops will stop the function of the system. The unit will lose its count as to the home position such that is requires the setup routine to be rm again to reset the system. Obviously, this is a very much more complicated problem that merely bumping a flashlight. Further, movement of batteries in a shade system causes noise and creates drag and generally decreases the life of the batteries and the desirability of using battery power.

As set forth more fully below, Applicants are aware that there is prior art in devices using a plurality of batteries that uses a shrink wrap tubing over the batteries to facilitate easy changing of the battery pack and to limit battery movement relative to each other. Obviously, however, this does not address the issue of relative movement of the batteries to the holder and the holder to the tube roll.

Further, it is necessary to have clearance between the battery holding tube, or tube roll, and the batteries for ease in changing the batteries but this clearance becomes a problem because the diameter of the batteries change from different manufacturers or different production runs from a manufacturer.

In this regard, a number of years ago the National Electrical Manufactures Association developed a consensus standard "General and Specifications" for "Portable Primary Cells and Batteries with Aqueous Electrolyte" that was adopted as an America National Standard ANSI C18.1M. Looking under "Battery Specification" section you will find the minimum and maximum specification for the outside diameter for batteries. For example a "D" size battery (referred to as a 13a battery) has a minimum diameter of 1.272 inches or 32.3 mm and a maximum diameter of 1.346 inches or 34.2 mm. With normal manufacturing tolerances for the tube holding the batteries, the clearance can be greater than the normal springs and clips can hold to prevent undesired movement of the batteries. Likewise, the tube may be too large to accommodate desired batteries altogether.

Applicants are aware of the following art:

U.S. Re 29,047 to Brindley discloses a switching module for detachably mounting to various size lens and reflector units and battery casings, the module comprising a tubular casing having a lamp-circuit controlled push button switch mounted therein with the button segment facing a flexible boot covered opening in the wall of the casing.

U.S. Pat. No. 4,114,187 to Uke discloses a diver's flashlight having a unitary case with a closed transparent end for light transmission, the other end being sealed by a threaded plug which also serves as a switch. A halogen bulb is mounted in a reflector immediately inside the transparent end and a rechargeable battery is held normally out of contact with the bulb by a spring. Tightening the threaded plug overcomes the spring and completes the circuit when the plug is fully seated in sealed position. The plugs, and a cap fitted over the transparent end, are of luminous material for night use.

U.S. Pat. No. 4,527,223 to Maglica discloses an improved flashlight which includes an improved mechanism for selectively varying the light beam intensity and area of illumination, an improved switch means, an improved light bulb and light bulb holder, and an improved manner of retaining dry cell batteries within the flashlight. The mechanism includes a double cam notch in a reflector support and abutting cam follower rotates cooperatively attached to a bulb holder to enable movement of the bulb forwardly and rearwardly relative to the light reflector through rotation of the head of the flashlight. The light bulb is configured to have a double pin electrical connection which plugs into a double socket thereby enabling the bulb and holder to have a smaller diameter incapable of passing through a smaller hole formed within the reflector. The switch is of the rotary type which wipes the contacts clean on rotation to enhance electrical conductivity. The batteries are held within the battery casing so that the front, center contact of the forward battery enters into a recessed area in contact with a spring loaded contact follower, with the front shoulder of the forward battery resting against the switch housing, thereby precluding battery cave-in and enhancing the rigidity with which the dry cell batteries are held within the flashlight.

U.S. Pat. No. 4,577,263 to Maglica discloses a miniature flashlight comprising a barrel, a tail cap, a head assembly, and a miniature bulb holder and providing interruptible contact to batteries within the barrel. The bulb holder comprises an insulated receptacle disposed external to the barrel end which the head assembly engages, a second insulated receptacle within the barrel engaging the first insulated receptacle enabling the first and second insulated receptacles to translate axially and limited by a flange on the first insulated receptacle and an annular lip formed inwardly at the barrel end, and a pair of conductors mounted in the second insulated receptacle such that one of the conductors couples the center electrode of a battery with the first bulb pin and the other conductor member couples the second bulb pin to the barrel lip. A spring fits between the tail cap and the batteries. The electrical circuit is closed by the barrel, the tail cap, and the spring to couple the second lamp pin to the battery case terminal. By threading the head assembly onto the barrel causing head assembly translation towards the tail cap, the reflector moves with respect to the bulb varying dispersion of the reflected lamp beam. Further rotation of the head assembly causes the reflector to contact the first insulated receptacle, translating the first insulated receptacle, the second insulated receptacle, and the batteries against the spring, until the first insulated receptacle flange abuts the barrel end, whereat the side conductor no longer contacts the barrel lip opening the circuit. The head assembly may be removed from the barrel and utilized as a base into which the tail cap and barrel may be inserted to stand the miniature flashlight, in its "on" condition, for use as a miniature table lamp.

U.S. Pat. No. 4,656,565 to Maglica discloses a flashlight that includes a barrel for retaining batteries. A reflector and lens located at one end is rotatable axially to vary the reflection dispersion of a light beam emanating through the lens from a lamp bulb. An internal cylindrical sleeve within the barrel provides the electrical path between a tail cap adjacent the one electrode end of the batteries and the end adjacent the reflector, lens, and bulb. The sleeve is a non-ferrous nickel plated material for improved conductivity between component parts. New contact materials are suggested as improvement but are still subject to deterioration from movement.

U.S. Pat. No. 4,680,682 to Parker discloses a waterproof flashlight in which there is utilized a lens housing movably mounted on a tubular barrel. Within the tubular barrel is located one or more batteries and also a light bulb with the light bulb to emit light through the lens housing. An elastomeric seal is to be located between the lens housing and the tubular barrel to prevent entry of water within the tubular barrel. A switch assembly is to be mounted on the tubular barrel which when moved will activate and deactivate the light bulb. The switch assembly includes a magnetically sensitive reed switch assembly mounted within the tubular barrel. This reed switch assembly is to be activated by a movable magnet mounted on the exterior surface of the tubular barrel.

U.S. Pat. No. 5,486,432 to Sharrah et al. discloses a battery assembly with two terminals at one end of a stack of cells. One of the terminals is centrally located upon the end of the stack and is electrically connected to the stack at the same end. The other terminal is spaced apart from the central terminal and is electrically connected to the other end of the stack by an elongated conductor. An insulating sheath holds the stack of cells together. In this patent, the battery stack 118 is surrounded by a sheath 130 which insulates the stack 118 and provides mechanical support or holds the cells together. The sheath 130 is preferably formed of shrink-wrap tubing. The sheath 130 tightly surrounds the stack 118, leaving at least portions of the top cell contact 104 and the bottom cell contact 122 exposed. Further, after the terminal extension piece 128 is fitted to the stack, the battery assembly 100 is wrapped in a second sheath 132 surrounding both the stack and the terminal extension piece 125. The second sheath 132 is preferably formed of shrink-wrap tubing, which is of sufficient length to leave the terminal 102 of the terminal extension piece 128 exposed. The second sheath provides further insulation and mechanical support to the battery assembly and also serves to protect the terminal extension piece 128 from damage due to impact against the interior surface of the barrel 26 or during shipment. The second sheath is preferably of sufficient thickness to provide a snug fit of the battery assembly 100 within the barrel 26 so that the battery assembly 100 does not vibrate within the barrel 26 and detract from the solid "feel" of the flashlight.

U.S. Pat. Nos. 6,057,658, 6,181,089, 6,259,218, and 6,369,530 to Kovach et al. disclose wireless battery-operated window covering assembly or shade system as that term is used herein. The window covering has a head rail in which all the components are housed. These include a battery pack, an interface module including an IR receiver and a manual switch, a processor board including control circuitry, motor, drive gear and a rotatably mounted reel on which lift cords wind and unwind a collapsible shade. The circuitry allows for dual-mode IR receiver operation and a multi-sensor polling scheme, both of which are configured to prolong battery life. Included among these sensors is a lift cord detector which gauges shade status to control the raising and lowering of the shade and a rotation sensor which, in conjunction with internal registers and counters keeps track of travel limits and shade position. These patents disclose batteries in a tube but the tube does not rotate.

U.S. Pat. No. 6,680,594 to Collett et al. discloses an apparatus for effecting and controlling the movement of a window covering member between different positions in response to a disturbance of the window covering. Also, it discloses an apparatus for assisting the manipulation of a window covering by way of potential energy stored in a spring and a torque sending device having a design that is insensitive to component tolerances. The Invention may also include a counterbalance mechanism for assisting the movement of the shade. One known problem with devices for raising and lower shades using battery operated mechanisms is the limitation on the weight of the shade. When a shade design reaches a certain weight, a battery no longer stores enough power to raise and lower the shade numerous times. For example, battery operated lifting mechanisms have not been practical for use with wood slatted horizontal blinds because the small batteries useful in head rails could only raise these blinds a limited number of times before discharging to the point that they become non-functional. This limits the usefulness of batteries battery applications on heavy shades.

U.S. Pat. No. 7,389,806 to Kates discloses an electronically-controlled roll-up window shade that can easily be installed by a homeowner or general handyman. The motorized shade includes an internal power source, a motor, and a communication system to allow for remote control of the motorized shade. One or more motorized shades can be controlled singly or as a group. In one embodiment, the motorized shades are used in connection with a zoned or non-zoned HVAC system to reduce energy usage. In one embodiment, the motorized shade is configured to have a size and form-factor that conforms to a standard manually-controlled motorized shade. In one embodiment, a group controller is configured to provide thermostat information to the motorized shade. In one embodiment, the group controller communicates with a central monitoring system that coordinates operation of one or more motorized shades. In one embodiment, the internal power source of the motorized shade is recharged by a solar cell.

U.S. Pat. No. 7,375,494 to Daniel et al. discloses a rechargeable battery assembly that comprises a rechargeable battery unit and a data and power connector plug. The battery assembly has a deployed configuration in which the battery assembly has the general form of, and functions as, a conventional battery format, and a recharge configuration in which the data and power connector plug is made accessible to enable the connector to be connected to a suitable receptacle on a computing or peripheral device for recharging of the battery.

Despite the efforts indicated in the prior art, what is missing and still needed is a way to hold batteries in a rotating tube to prevent wear and tear on electrical connections. Further there is a need for an apparatus and method for compensating for the manufacturing differences in the size of the batteries and the tube. Still further there is a need to reduce the noise of battery operated devices caused by movement of the batteries within the holder. Further, there is a need for a device that centers batteries within a rotating tube in order to reduce wobble and wear on the rotating tube and drain on the batteries in overcoming the wobble effect.

SUMMARY OF THE INVENTION

Accordingly, the battery holder apparatus of the present invention, according to one embodiment includes a sleeve with an inside surface and an outside surface where the sleeve is flexible. A battery receiving space is created within the sleeve where the battery receiving space expands and the sleeve flexes to accommodate a battery when inserted therein and the inside surface at least partially contacts the battery. A connection device is provided on the outside surface of the sleeve.

As used herein, terms are given their common meaning. Thus "sleeve" is a structure that at least partially wraps around and encloses an object. "Flexible" is used to describe an elastic structure that has a resting, unstressed first form and a second, expanded, stressed form. In the second form the flexible sleeve exerts compressive force to the object that caused it to expand. That is, the flexible sleeve returns to the approximate first form upon removal of the object. "Connection device" is a device for connecting one object with another. Any such device now known or hereafter developed for doing so is included herein. As described and illustrated, the connection device may be the contact of the outside surface of one device with the inside surface of another device. Further, the connection device may be enhanced by protrusions on the outside surface. Still further, the connection device may be conformed to connect with cooperating structures in another device, all as disclosed and described herein.

In another aspect of the invention, the sleeve is C-shaped and the sleeve includes a first finger and a second finger where the first finger is spaced apart from the second finger.

In one aspect, the connection device is said outside surface of the sleeve. In another aspect, the connection device is a protrusion formed in the sleeve. In a further aspect, more than one protrusion is provided and in another aspect, the more than one protrusions are approximately evenly spaced around the outside surface.

In one aspect, the battery holder connection device is conformed to cooperate with a tube roll connection device in a tube roll. In another aspect, the invention further includes cutouts in the sleeve. In a further aspect, the sleeve is formed from a material selected from a group of materials consisting of: extruded non-metallic material, molded non-metallic material, and roll formed metallic material.

According to another embodiment, in a shade system with a tube roll, a battery holder apparatus included a sleeve with an inside surface and an outside surface where the sleeve is flexible and where the sleeve is C-shaped and the sleeve includes a first finger and a second finger where the first finger is spaced apart from the second finger. A battery receiving space is created within the sleeve where the sleeve flexes and the battery receiving space expands with a battery therein and the inside surface at least partially contacts the battery. A connection device is provided on the outside surface of the sleeve where the connection device connects the sleeve with the tube roll.

As used herein, the term "shade system" is used to describe a system for manipulating a shade so as to provide shade for a window or door, for example only and not by way of limitation. Further, as used herein the shade system includes a tube roll. As used herein the term "tube roll" identifies a hollow tube to which a shade is attached. The tube roll normally may or may not house batteries but in the preferred embodiment it does house batteries as illustrated and described herein.

In one aspect, the connection device is a protrusion formed in the sleeve. In another aspect, more than one protrusion is provided. In a further aspect, the more than one protrusions are approximately evenly spaced around the outside surface.

In another aspect, the battery holder connection device is conformed to cooperate with a tube roll connection device in the tube roll. In one aspect, cutouts are provided in the sleeve.

In a further aspect, the sleeve is formed from a material selected from a group of materials consisting of: extruded non-metallic material, molded non-metallic material, and roll formed metallic material.

According to another embodiment of the invention, a battery holder method includes the steps of:

a. providing a sleeve with an inside surface and an outside surface wherein the sleeve is flexible; creating a battery receiving space within the sleeve wherein the battery receiving space expands and the sleeve flexes to accommodate a battery when inserted therein and the inside surface at least partially contacts the battery; and providing a connection device on the outside surface of the sleeve; and b. inserting a battery into the battery receiving space.

In a further aspect of this invention, the method includes inserting the battery holder into a tube roll of a shade system such that the connection device connects with the tube roll and prevents movement of the battery holder relative to the tube roll.

In another aspect, the connection device is in the form of multiple protrusions and the multiple protrusions connect with the tube roll so as to center the battery holder within the tube roll.

In one aspect, the method further includes the step of forming the sleeve is from a material selected from a group of materials consisting of: extruded non-metallic material, molded non-metallic material, and roll formed metallic material.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

The preferred embodiment of the present invention is illustrated by way of example in FIGS. 1-12. With specific reference to FIG. 1, the battery holder apparatus 10, according to a preferred embodiment, is shown in use with a shade system 12. Shade system 12, as described above, may be any shade system now known or hereafter developed and includes a tube roll 14. Tube roll 14 is hollow and includes end caps 16 and 18. In practice, as is known in the art, a shade, not shown for clarity, is attached to the tube roll 14 and is wound onto and off of tube roll 14 as the shade system 12 is operated.

Figure 1:
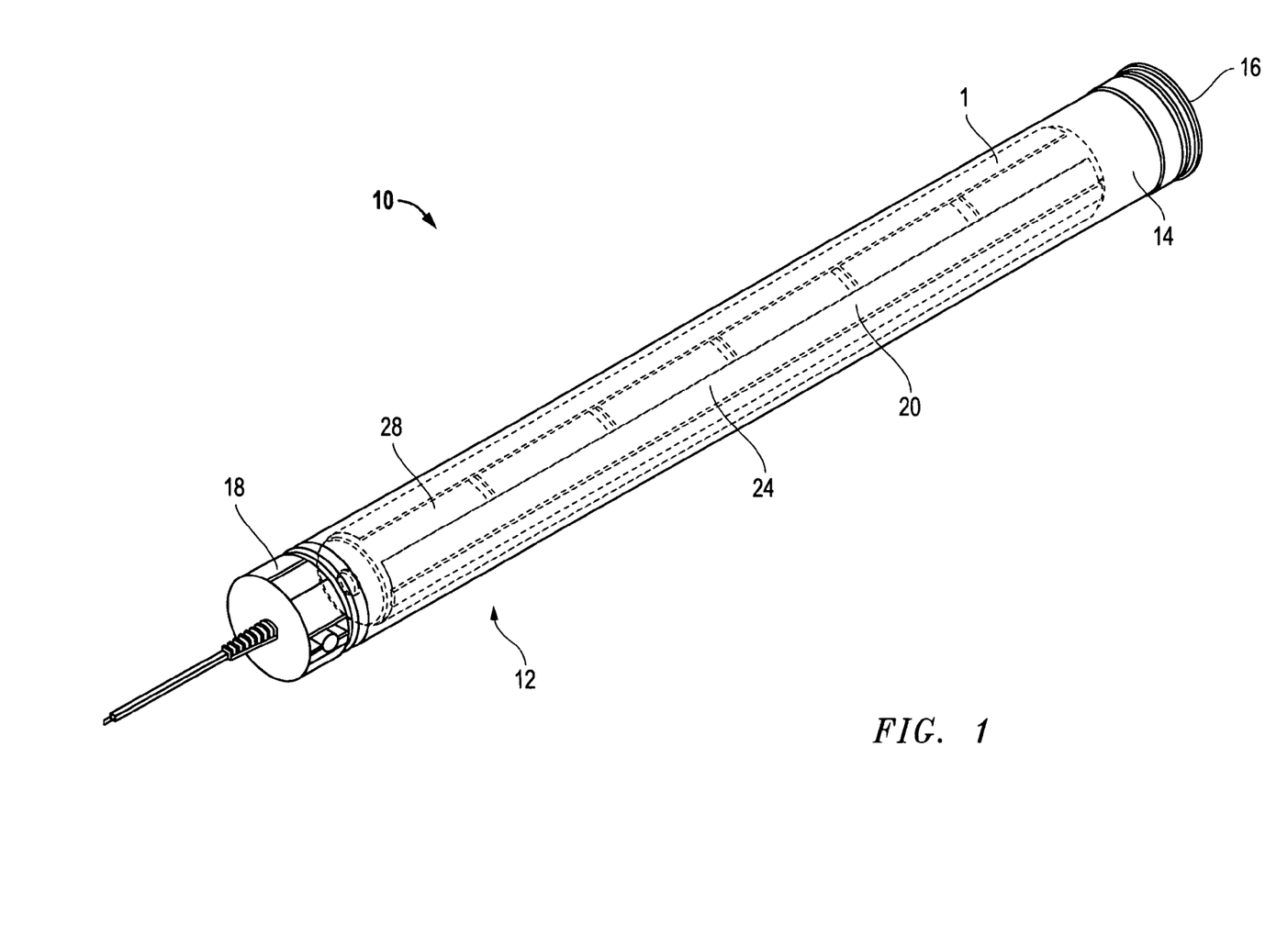
FIG. 1 is a perspective, partial see through view of a shade system tube roll, and the battery holder apparatus of the present invention within the tube roll and showing the batteries and sleeve.

As a preferred embodiment, battery holder apparatus 10 is used in conjunction with shade system 12 and tube roll 14 in particular. Nonetheless, it should be understood that battery holder 10 is not limited to such use and may be used in other devices as well.

Figure 3:
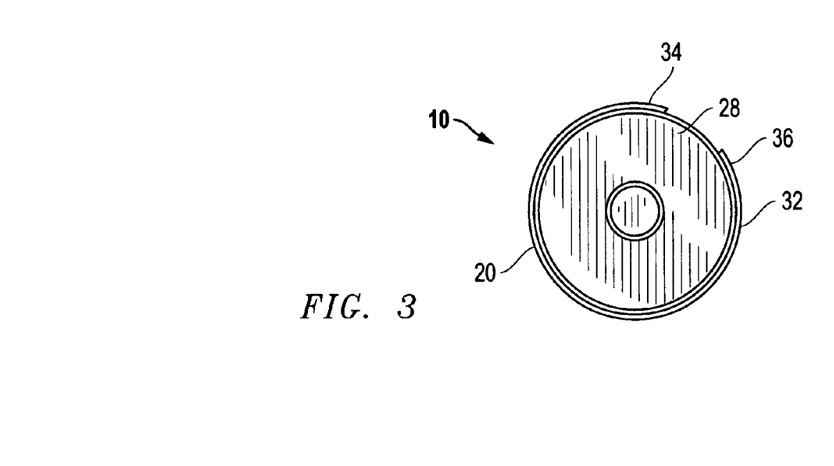
FIG. 3 is an end view of FIG. 2.
Figure 5:
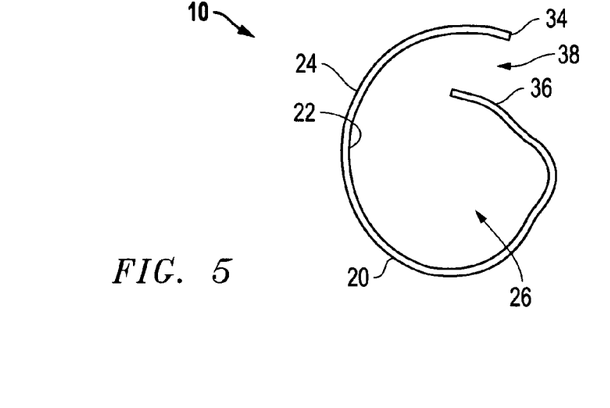
FIG. 5 is an end view of FIG. 4.

As illustrated, battery holder apparatus 10 includes a sleeve 20. Sleeve 20 includes an inside surface 22 and an outside surface 24. Sleeve 20 includes a battery receiving space 26. Sleeve 20 is flexible as described herein and illustrated, such that battery receiving space 26 expands and sleeve 20 flexes as a battery 28 is inserted within sleeve 20. This feature of the invention will be described more fully hereafter but may be understood by comparing FIG. 5, showing an empty sleeve 20, and FIG. 3, showing a sleeve 20 with a battery 28 inserted within battery receiving space 26 and the resultant expansion of battery receiving space 26 and flexing of sleeve 20 to accommodate battery 28. Further. as illustrated, battery holder apparatus 10 is open ended. That is sleeve 20 has no ends and is open not closed from end to end and at both ends as the figures clearly show.

Battery holder apparatus 10 also includes a connection device 30. Connection device 30 may be the portion of outside surface 24 that comes in contact with the inside of tube roll 14. Connection device 30 may also consist of a protrusion 32 of the outside surface 24 of sleeve 20 as more clearly shown in FIGS. 3, 4 and 5 and as will be discussed more fully hereafter.

Figure 2:
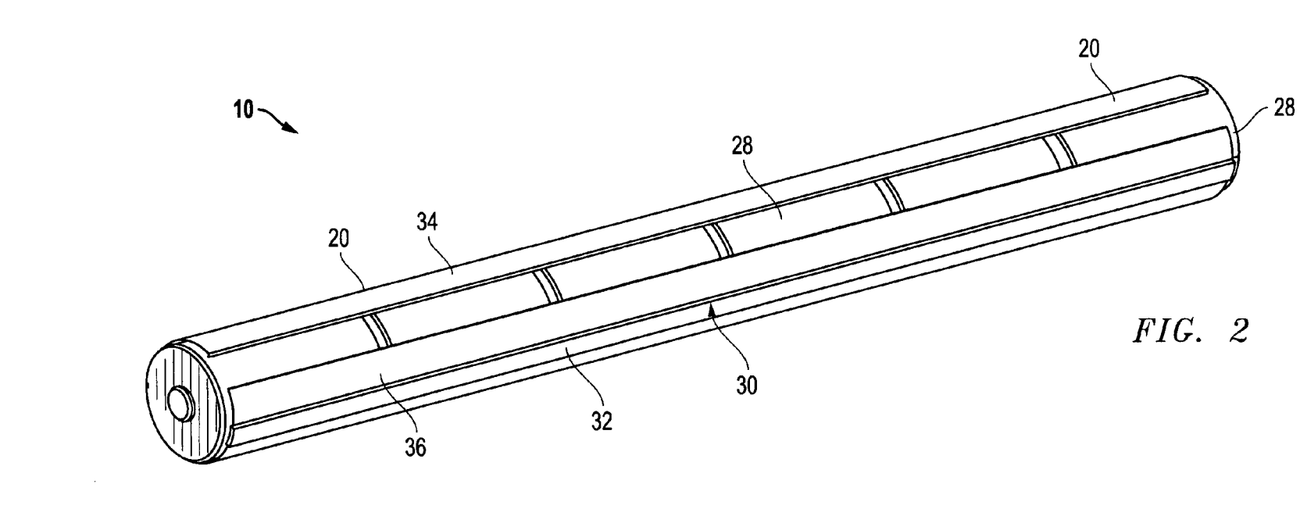
FIG. 2 is a perspective view of the invention of FIG. 1 showing batteries in the sleeve.

Referring to FIGS. 2 and 3, battery holder apparatus 10 is shown alone and not in combination with shade system 12. From these figures it is easily seen that in a preferred embodiment, sleeve 20 is "C-shaped" and includes a first finger 34 and a second finger 36. First finger 34 is separated from second finger 36 by a space 38. Preferably space 38 runs the entire length of sleeve 20 as shown in FIG. 2.

Figure 4:
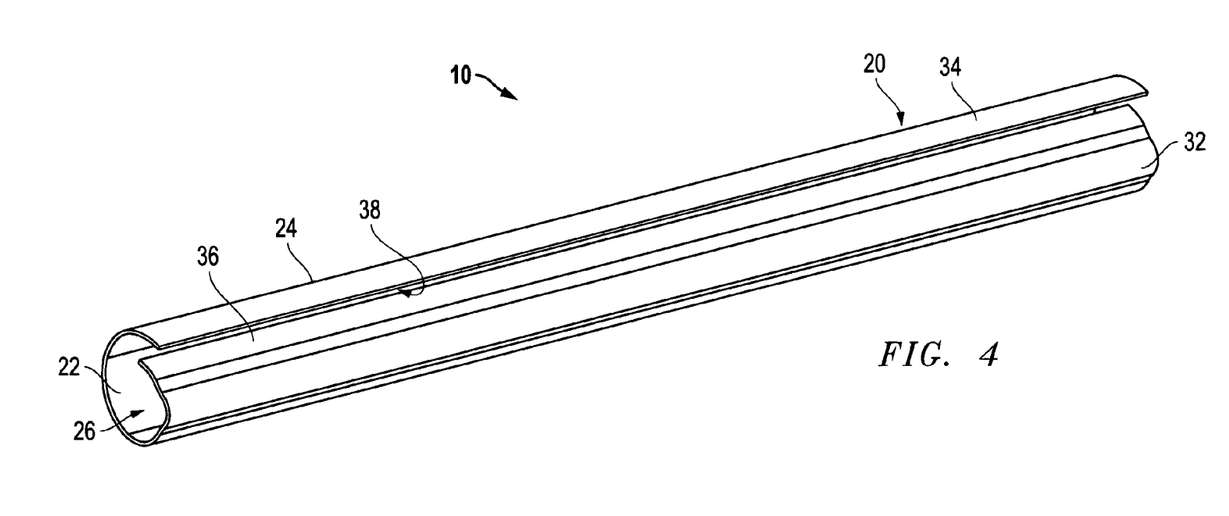
FIG. 4 is a perspective view of the sleeve of this invention according to a preferred embodiment.

Referring now to FIGS. 4 and 5, other advantages and features of the invention are described. FIGS. 4 and 5 show sleeve 20 as "C" and almost "G" shaped where second finger 36 is spaced apart from and essentially underneath first finger 34 when sleeve 20 is at rest and unstressed by the presence of a battery 28. Further, these figures also clearly illustrate the inside 22 and the outside 24 of sleeve 20.

Figure 6:
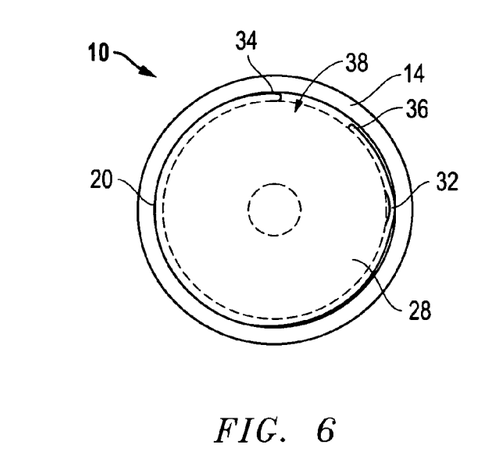
FIG. 6 is an end view of the tube roll with the battery holder of the present invention located within, the battery and the sleeve shown at the maximum tolerance dimension.
Figure 7:
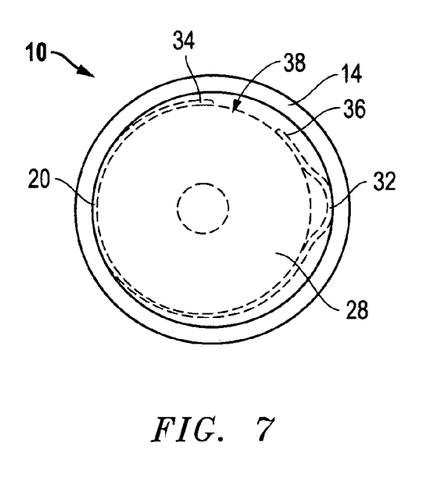
FIG. 7 is an end view of the tube roll with the battery holder of the present invention located within, the battery and the sleeve shown at the minimum tolerance dimension.
Figure 8:
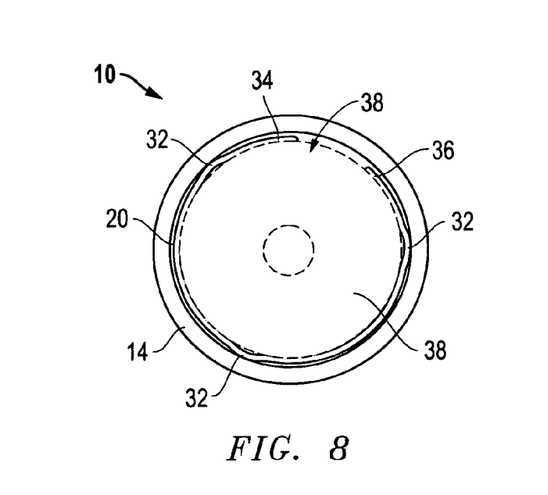
FIG. 8 is an end view of the tube roll with the battery holder of the present invention located within, the battery and the sleeve shown at the maximum tolerance dimension and illustrating approximately equally spaced protrusions centering the battery within the tube roll.

Referring now to FIGS. 6, 7 and 8, the dual capabilities of the sleeve 20 to expand as needed to fit batteries 28 of different dimensions while still securing sleeve 20 within tube roll 14 is shown. FIG. 6 shows a large dimension battery 28 located in the battery receiving space 26. This has required battery receiving space 26 to expand and flexible sleeve 20 to do likewise. The outside surface 24 of sleeve 20 is almost totally in contact with the inside of tube roll 14. This by itself is generally all that is required to secure battery holder 10 in place and prevent movement of battery sleeve 20 relative to tube roll 14 as tube roll 14 rotates. Connection device 30 thus consists essentially of the expanded outside surface 24 in contact with tube roll 14 as shown.

Additionally, however, connection device 30 may also include a protrusion 32. Extending from the outside surface 24 of sleeve 20, protrusion 32 ensures a connection of sleeve 20 with tube roll 14.

FIG. 7 illustrates the increased need for protrusion 32 when the battery size differs from that in FIG. 6. Here the battery is smaller in dimension. Here too battery 28 fits within battery receiving space 26 and it expands as does flexible sleeve 20 to receive the smaller battery 28. In this instance, not nearly as much of the outside surface 24 of sleeve 20 is in contact with tube roll 14. This risks movement of sleeve 20 relative to tube roll 14. Thus, in this case, protrusion 32 fills the empty space and makes secure contact with tube roll 14 to prevent any relative movement of the sleeve 20. It should be noted that here the combination of connection device 30 in the form of the outside surface 24 of sleeve 20 in combination with connection device 30 in the form of protrusion 32 work together to secure battery holder apparatus 10 in place.

FIG. 8 illustrates another embodiment of the invention in which sleeve 20 includes more than one protrusion 32. Here three protrusions 32 are shown approximately evenly spaced around the circumference of sleeve 20. With a battery 28 in place in battery receiving space 26, it expands as does flexible sleeve 20 as described above. In this case, however, the evenly spaced protrusions 32 cooperate to center battery 28 within tube roll 14. That is, battery 28 is aligned with the axis of rotation of tube roll 14 such that no wobble is introduced as the combination rotates together. In this manner, not only are the batteries 28 secured against movement as the tube roll 14 rotates, but they are in line with the axis of rotation and thus impart no unwanted stress on the system as it does so.

Figure 9:
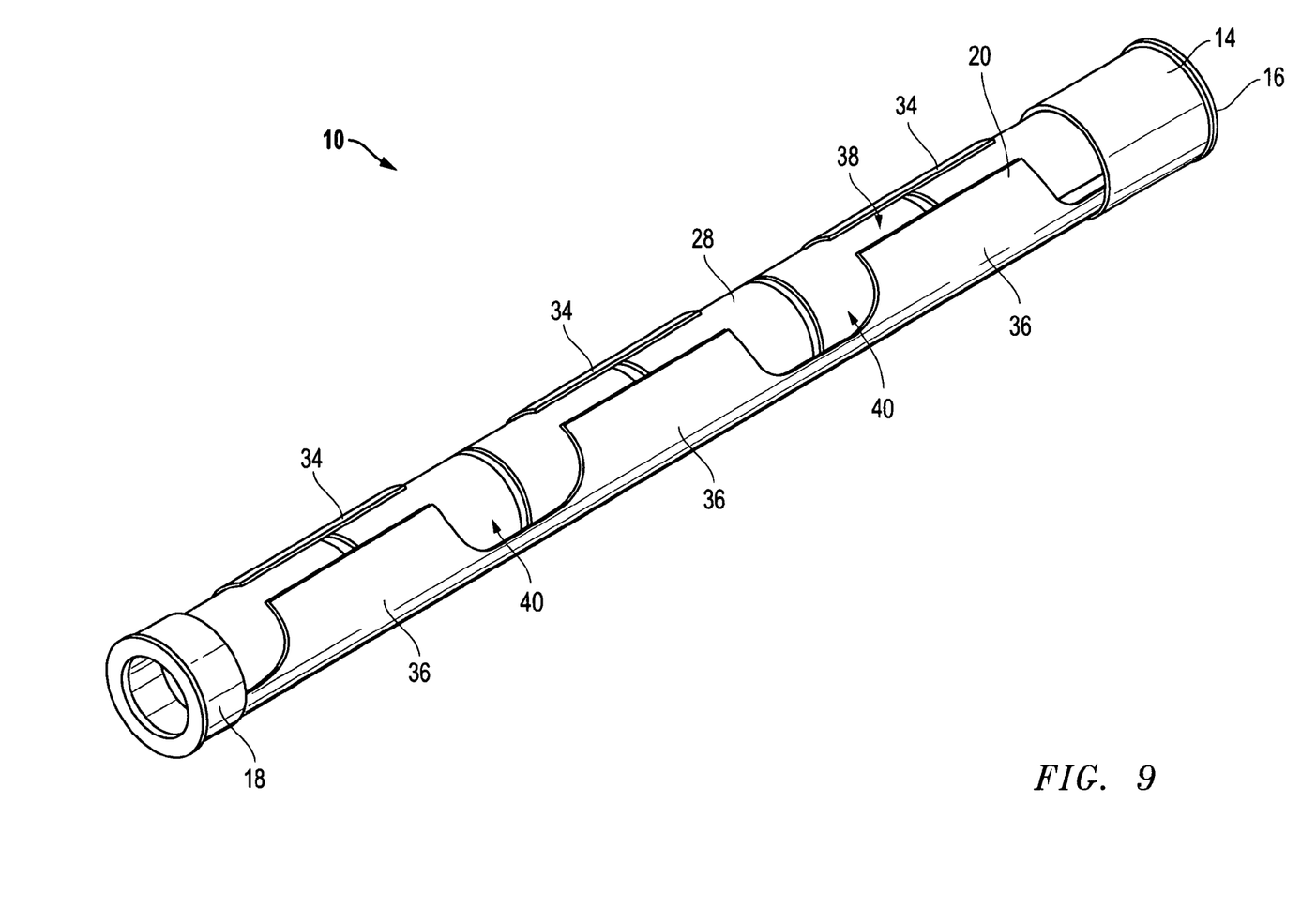
FIG. 9 is a perspective view of a partially cut away tube roll with the battery holder according to another embodiment of the invention.
Figure 10:
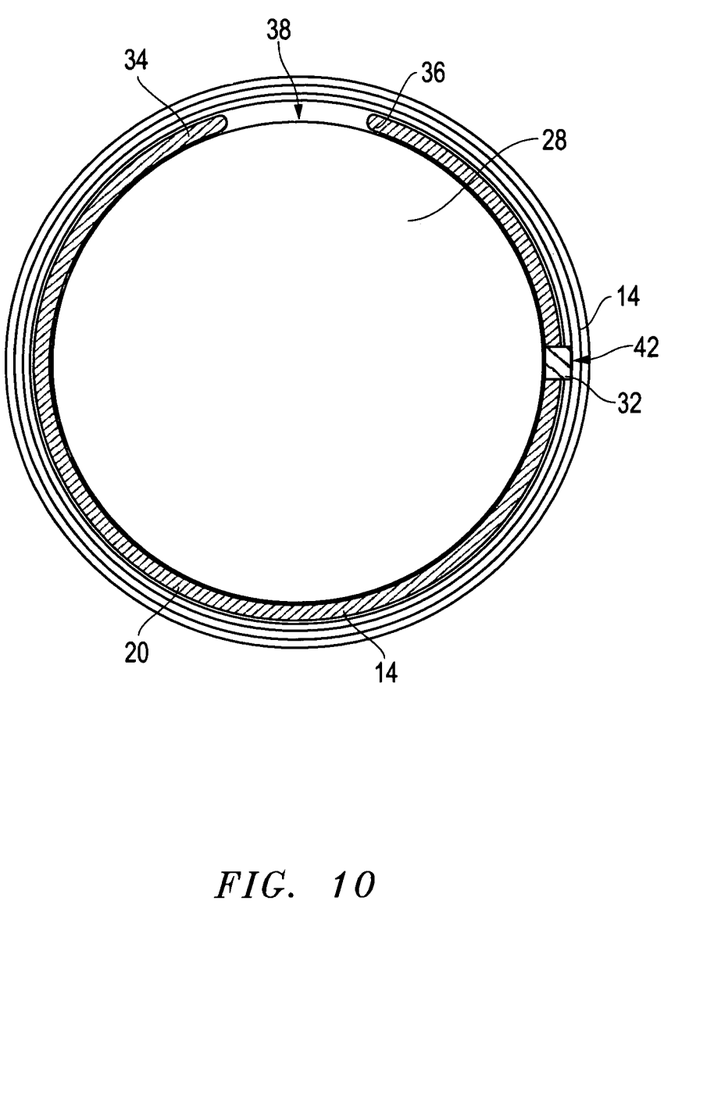
FIG. 10 is a section view of FIG. 9 taken along lines 10-10.
Figures 11, 12:
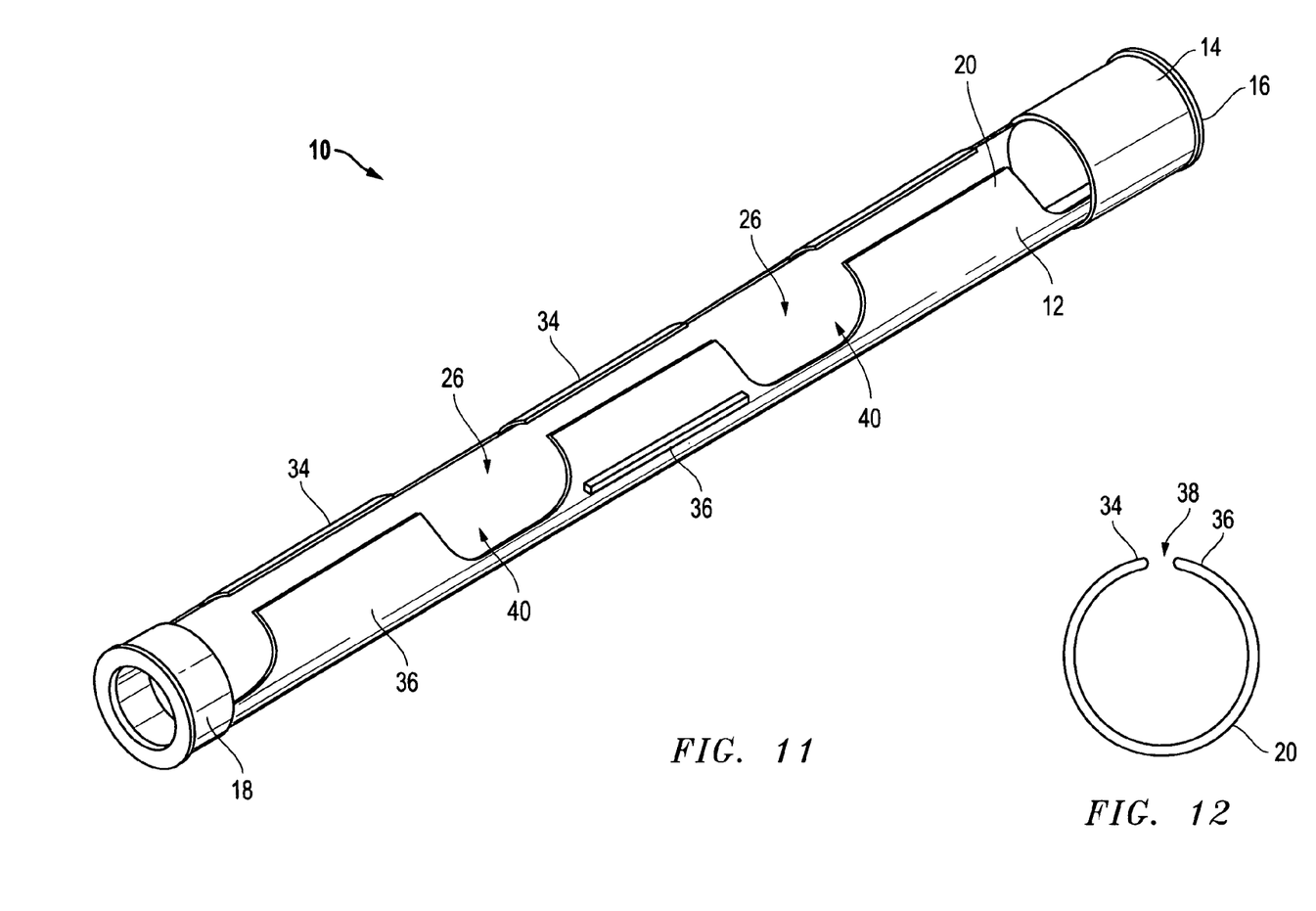
FIG. 11 is a perspective view of the embodiment of FIGS. 9 and 10 without batteries.
FIG. 12 is an end view of FIG. 11.

Referring now to FIGS. 9, 10, 11 and 12, another embodiment of the invention is illustrated. As shown in FIGS. 9 and 11, in this embodiment, sleeve 20 includes cutouts 40. First fingers 34 and second fingers 36 are curved inward toward space 38. Preferably, first fingers 34 and second fingers 36 curve in toward battery receiving space 26 such that the insertion of battery 28 into the space expands the space as the sleeve 20 flexes and the fingers apply "gripping" pressure on the batteries 28. In this embodiment, cutouts 40 enable a user to quickly and easily replace batteries 28 and reduce the overall weight of battery holder apparatus 10 which, Applicants have determined, greatly increases the life span of the batteries 28.

FIG. 10 illustrates another element of this invention in which the connection device 30 on sleeve 20 is a protrusion 32 that fits within a corresponding slot 42 on the inside of tube roll 14. This effectively locks battery holder apparatus 10 with tube roll 14 should the connection device 30 in the form of the outside surface 24 of sleeve 20 not be sufficient. FIG. 12 shows the sleeve 20 without the protrusion 32 as this may not be always required.

By way of further discussion and disclosure, it should be understood that any flexible, elastic material now known or hereafter developed that functions as described is suitable for the purposes of this invention. Elastic plastics and flexible and resilient metallics are suitable whether it is extruded non-metallic material, molded non-metallic material or roll formed metallic material.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A roller shade comprising:
a tube roll;
the tube roll having a generally cylindrical exterior surface and a hollow interior;
a shade attached to the tube roll;
a sleeve positioned within the hollow interior of the tube roll;
the sleeve extending a length and having an inside surface and an outside surface, wherein the sleeve is flexible;
the sleeve having a continuous hollow battery receiving space positioned within the sleeve and extending the length of the sleeve wherein the battery receiving space expands and the sleeve flexes to accommodate a plurality of batteries positioned within the battery receiving space such that the inside surface of the sleeve at least partially contacts the plurality of batteries;
wherein when the roll tube is rotated the shade is opened or closed as the shade wraps or unwraps around the roll tube;
wherein when the roll tube is rotated the sleeve holds the plurality of batteries in place thereby reducing the movement of the plurality of batteries relative to the roll tube.

2. The invention of claim 1 further comprising at least one connection device formed in the sleeve.

3. The invention of claim 1 further comprising a connection device formed in the sleeve wherein the connection device engages an interior surface of the hollow interior of the tube roll.

4. The invention of claim 1 further comprising a connection device formed in the sleeve wherein the connection device formed in the sleeve cooperates with a tube roll connection device in the tube roll thereby reducing the movement of the sleeve relative to the roll tube.

5. The invention of claim 1 further including cutouts in the sleeve.

6. A roller shade comprising:
a tube roll;
the tube roll having a generally cylindrical exterior surface and a hollow interior;
a shade attached to the tube roll;
a battery tube positioned within the hollow interior of the tube roll;
the battery tube having a hollow interior;
a sleeve positioned within the battery tube;
the sleeve extending a length and having an inside surface and an outside surface wherein the sleeve is flexible;
the sleeve having a continuous hollow battery receiving space positioned within the sleeve and extending the length of the sleeve wherein the battery receiving space expands and the sleeve flexes to accommodate a plurality of batteries positioned within the battery receiving space such that the inside surface of the sleeve at least partially contacts the plurality of batteries;
wherein when the roll tube is rotated the shade is opened or closed as the shade wraps or unwraps around the roll tube;
wherein when the roll tube is rotated the sleeve holds the plurality of batteries in place thereby reducing the movement of the plurality of batteries relative to the roll tube.

7. The invention of claim 6 wherein the sleeve is C-shaped and includes a first finger and a second finger.

8. The invention of claim 6 further comprising at least one connection device in the sleeve, wherein the connection device is a protrusion.

9. The invention of claim 6 further including cutouts in the sleeve.

10. The apparatus of claim 1 including more than one battery within said sleeve positioned in end to end alignment wherein said sleeve reduces battery movement during tube roll rotation.

11. The apparatus of claim 1 wherein the sleeve is open ended and the plurality of batteries are inserted into and removed from an open end of the sleeve.

12. The apparatus of claim 1 further comprising a battery tube positioned within the roll tube, wherein the sleeve is positioned within the battery tube within the roll tube.

13. The apparatus of claim 1 wherein rotation of the tube roll simultaneously rotates the sleeve and the plurality of batteries.

14. The apparatus of claim 6 wherein the plurality of batteries within the sleeve are positioned in end to end alignment.

15. The apparatus of claim 6 wherein the sleeve is open ended and the plurality of batteries are inserted into and removed from an open end of the sleeve.

16. The apparatus of claim 6 wherein an exterior surface of the battery lube engages the interior surface of the roll tube.

17. The apparatus of claim 16 wherein rotation of the tube roll simultaneously rotates the battery tube the sleeve and the plurality of batteries.

* * * * *

UNITED STATES PATENT AND TRADEMARK OFFICE
CERTIFICATE OF CORRECTION

PATENT NO.      : 8,968,900 B2
APPLICATION NO. : 12/932611
DATED           : March 3, 2015
INVENTOR(S)     : Willis Jay Mullet, Christopher Lee Wysoczynski and Harry Edward Asbury It is certified that error appears in the above-identified patent and that said Letters Patent is hereby corrected as shown below:

In the Claims

Column 9, line 50, Claim 6, delete "Lo" and insert --to--.

Signed and Sealed this
Second Day of June, 2015

Michelle K. Lee
*Director of the United States Patent and Trademark Office*